United States Patent [19]

Kinugasa et al.

[11] Patent Number: 5,075,264
[45] Date of Patent: Dec. 24, 1991

[54] SLIDER COMPOSED OF HIGH-DENSITY SILICON CARBIDE SINTERED COMPACT

[75] Inventors: Hisashi Kinugasa, Takarazuka; Nobuto Mukae, Sanda, both of Japan

[73] Assignee: Nippon Pillar Packing Co., Ltd., Osaka, Japan

[21] Appl. No.: 681,614

[22] Filed: Mar. 28, 1991

Related U.S. Application Data

[63] Continuation of Ser. No. 540,450, Jun. 18, 1990, abandoned, which is a continuation of Ser. No. 842,567, Mar. 21, 1986, abandoned.

[51] Int. Cl.[5] ............................................. C04B 35/56
[52] U.S. Cl. ........................................ 501/88; 501/89; 501/90
[58] Field of Search .............................. 501/88, 89, 90

[56] References Cited

FOREIGN PATENT DOCUMENTS 59-131577  7/1984  Japan .

Primary Examiner—William R. Dixon, Jr.
Assistant Examiner—C. Melissa Bonner
Attorney, Agent, or Firm—Jones, Tullar & Cooper

[57] ABSTRACT

Disclosed herein is a slider of which sliding performance, i.e., sealing performance is improved, without decline of combination strength of grain boundaries and abrasion resistance, by including 2–10%, more preferably 3–8% by weight of free carbon in a slider composed of a high density silicon carbide sintered compact of which relative density is not less than 95%.

2 Claims, 1 Drawing Sheet

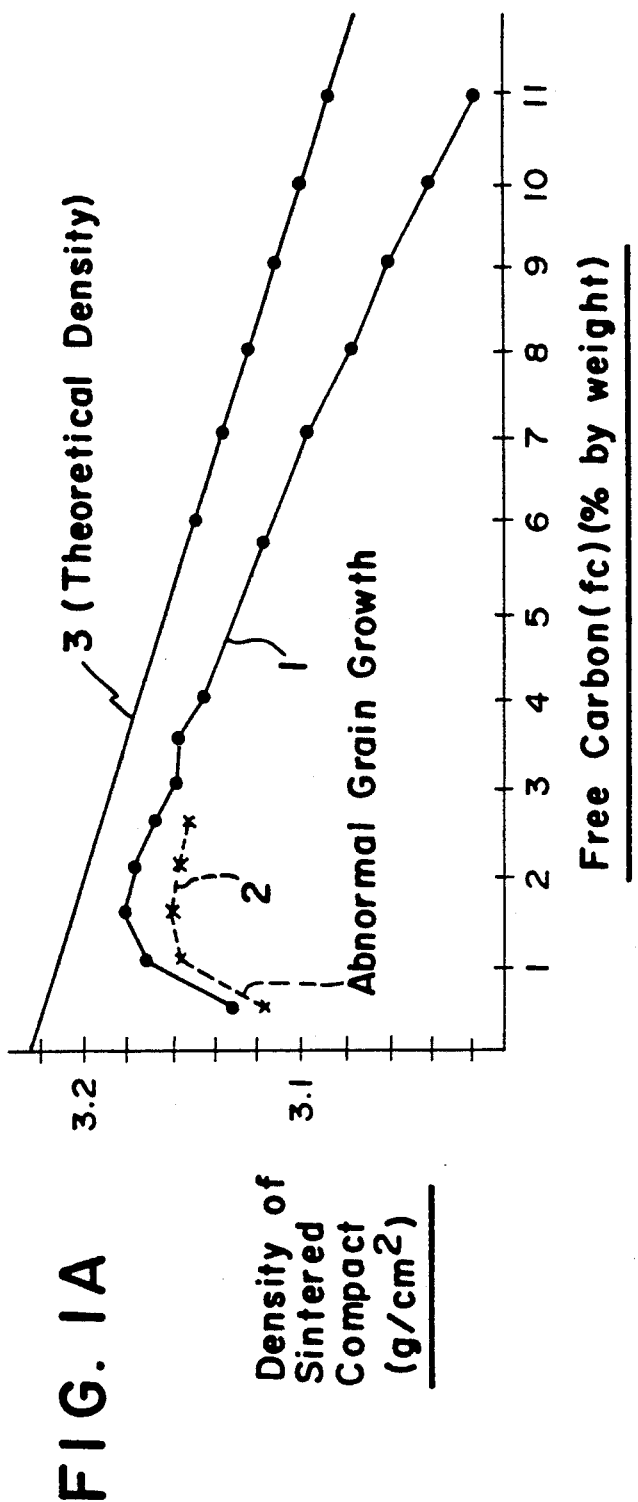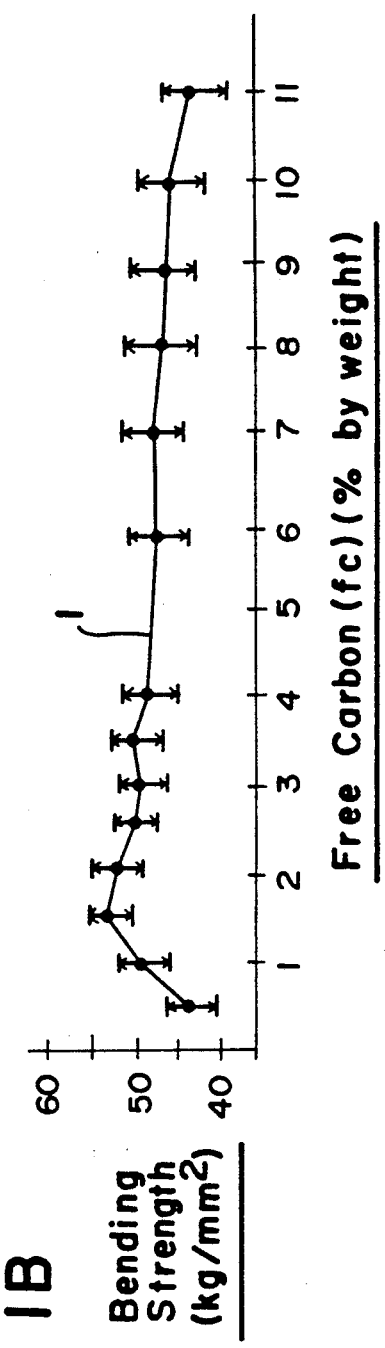
FIG. 1A
FIG. 1B

SLIDER COMPOSED OF HIGH-DENSITY SILICON CARBIDE SINTERED COMPACT

This is a continuation of co-pending application Ser. No. 07/540,450 filed on June 18, 1990, which is a continuation of application Ser. No. 06/842,567, filed Mar. 21, 1986.

BACKGROUND OF THE INVENTION

1. Field of the invention

This invention relates to a slider for use in mechanical seals, bearings, valve seats, etc. under severe atmospheric conditions, and more particularly to a high performance slider of silicon carbide sintered compact of which the friction coefficient is reduced in addition to improving the lubrication property, mechanical strength, abrasion resistance, etc.

2. Prior art

A high-density silicon carbide sintered compact (hereinafter referred to as "SiC sintered compact") has long been known for its excellent property such as excellent resistance to heat, abrasion and corrosion, etc., and is one of the useful ceramics used, for example, in gas turbines. In particularly the SiC sintered compact has already been put in practical use as sliders for mechanical sealing and is now considered one of the high performance slider materials with the aforementioned excellent property.

With an increasing of demand for highly effective seals, bearings, etc. under the background of remarkable technological development, a higher sealing performance is now required in mechanical seals, a higher lubricating performance in bearings and a higher sliding performance in sliders composed of the SiC sintered compact.

Looking at known SiC sintered compacts actually used, they are obtained, for example, by a step of admixing a fixed amount of boron compound and/or aluminum compound, each serving as a sintering accelerator, with a fixed amount of carbon serving as a sintering aid, a step of molding into a compact, and a step of sintering the compact at a high temperature of not lower than 2000° C. under an inert atmosphere. However, free carbon is found not only on the surface of SiC sintered compact but also at grain boundaries thereof due to a sublimate decomposition reaction of SiC itself at the sintering step. As a result, there exists when viewed microscopically crystal grains of SiC and grain boundaries of carbon on the surface of the high-density SiC sintered compact used for mechanical sealing. In other words, there is a segregation of carbon at fine cavities on the surface of the compact.

As is well known, carbon has a lipophilic property as well as relatively high hydrophilic property, and therefore it is usually possible for a high-density SiC sintered compact having the aforementioned microscopic carbon on the surface (i.e. sliding surface) to exhibit a high performance as a slider for mechanical sealing of fluid under a fluid lubrication. Due to a high temperature or a high viscosity produced in the liquid to be sealed, however, it is sometimes very difficult to stabilize a fluid lubrication film formed on the sliding surface in the case of a high-density SiC sintered compact of the aforementioned composition, and as a result, there is the possibility of abnormal abrasion or an increase of the friction coefficient on the sliding surface occuring which would cause thereby a decline in the sealing performance.

Accordingly, in the case of a slider composed of such a high-density SiC sintered compact, it is necessary to increase carbon content in order to improve stabilization of the fluid lubrication film on the sliding surface. But when free carbon (fc) is excessively increased in the SiC sintered compact, there exists a problem in that a desired dense packing (i.e., high density) of the sintered compact is not gained due to the increase of the carbon crystal structures and as a result the combination strength of the grain boundaries is considerably lowered, eventually declining the abrasion resistance to be exhibited by the slider.

SUMMARY OF THE INVENTION

In view of the above-discussed problem of the known art, an object of this invention is to provide a slider of silicon carbide sintered compact in which the combination strength of the grain boundaries and abrasion resistance do not decline excessively in spite of the relative increase of the free carbon in the sintered compact, and the sliding performance, i.e., lubricating performance, is sufficiently improved.

In order to accomplish the foregoing object, a slider according to this invention is composed of a high-density silicon carbide having a relative density of not less than 95% and containing free carbon in the range of 2-10% by weight, more preferably, in the range of 3-8% by weight.

Other objects and features of this invention will become apparent in the course of the following description together with the accompanying drawings.

BRIEF DESCRIPTION OF THE DRAWINGS

FIG. 1 A is a characteristic curve showing a relation between the percentage by weight of a free carbon (fc) and the density of silicon carbide sintered compact in one embodiment of this invention; and FIG. 1 B is a characteristic curve showing a relation between the percentage by weight and bonding strength of a free carbon (fc) in the same embodiment.

DETAILED DESCRIPTION OF THE PREFERRED EMBODIMENT

As described above, in the case of a high-density SiC sintered compact obtained by the steps of admixing a fixed amount of boron compound and/or aluminum compound each serving as a sintering accelerator with a fixed amount of carbon serving as a sintering aid, molding into a compact, and sintering the compact at a high temperature of not lower than 2000° C. under a certain inert atmosphere, a desired high density of the sintered compact is not attained due to an excessive increase of (fc) and therefore the abrasion resistance declines considerably when using such an SiC sintered compact as a slider.

As a result of various studies and experiments, it has been concluded that in order to solve the noted problem, 2-10% by weight of free carbon should be contained in a high-density silicon carbide sintered compact of which the relative density is not less than 95% by using a pressureless sintering method. To be specific, a boron or boron compound (B or $B_4C$, for example) and an aluminum or aluminum compound (Al or AlN, $Al_2O_3$, for example) each serving as a sintering accelerator are admixed with highly refined fine particles of SiC the particle size of which is submicron. In this mixture, a total amount of such boron and aluminum materials of the SiC sintered compact should be in the range of 0.2-0.6% by weight and an atomic percentage therebetween should be in the range of $0.15 \leq B/Al < 2$.

Then, a synthetic resin such as a phenol resin, which can be carbonized, is further admixed so that 2-10% by weight (more preferably 3-8% by weight) of free carbon may be contained in the silicon carbon sintered compact to be obtained. The synthetic resin, which can be carbonized, is desired to be distributed as uniformly as possible. If the distribution of the resin is uneven or non-uniform, not only the strength of the SiC sintered compact but also its abrasion resistance is lowered when used as a slider.

It is further preferred that a titanium compound (TiC, TiB$_2$, TiO$_2$) be added in the range of 0.1-0.3% by weight as an abnormal grain growth inhibitor. Then the mixture is molded into a desired slider shape, and this row molded compact is subject to a pressureless sintering for a fixed time at 1900°-2200° C., more preferably at not lower than 1950° C. under a certain inert atmosphere. Thus a high-density SiC sintered compact having free carbon on the sliding surface and of which the relative density is not less than 95% is obtained.

It is to be noted that, in the sintering method described above, a pressureless method in which a row compact is formed and subject to the pressureless sintering is adopted to obtain a high-density SiC sintered compact instead of other methods such as reaction combination, chemical deposition or hot pressing. This is because by such pressurless sintering, sliders of comparatively intricated shape can be easily produced.

In the sintering described above, the total amount of boron and aluminum materials each admixed as a sintering accelerator is limited to 0.2-0.6% by weight of a high-density SiC sintered compact, when the total amount is over 0.6% by weight there is the possibility that a melt of the boron and aluminum materials of high temperature still remains after reaching a sintering temperature and accelerates abnormal grain growth resulting in lowering of the mechanical strength of the sintered compact. On the other hand, when the total amount is less than 0.2% by weight, the sintering may be unsuccessful.

The atomic percentage of B/Al is limited to $0.15 \leq B/Al < 2$; when less than 0.15, the percentage of Al becomes too high in relation to B and the strength at high temperature becomes considerably lower than the strength at normal temperature. On the other hand, when more than 2, it becomes difficult to obtain a close packed high density sintered compact and strength at high temperature becomes lower than that at normal temperature. Therefore, by arranging the atomic percentage between Al and B as described above, it becomes possible to obtain a high-density SiC sintered compact the strength of which does not decline both at normal temperature and high temperature.

The amount of titanic compound added as an abnormal grain growth inhibitor is limited to 0.1-0.3% by weight. When the amount is less than 0.1% by weight, inhibiting performance is not sufficiently exhibited. When more than 0.3% by weight, a desired high density of the SiC sintered compact is not attained due to an increase of impurities.

When containing a phenol resin, which can be carbonized, in the high-density SiC sintered compact in order to produce free carbon, since a decomposition temperature of phenol resin is relatively high, the free carbon is successfully distributed in the SiC sintered compact.

The following result is obtained by an experiment conducted in turbine oil on a slider composed of the foregoing high-density SiC sintered compact applied to a rotation side and a stationary side of a mechanical seal.

Sample A (1.5% of fc): Considerable peeling abrasion on the sliding surface (torque during the operation unstable);

Sample B (2.0% of fc): Partial peeling abrasion on the sliding surface (torque during the operation stable);

Sample C (3.0% of fc): Sliding surface unchanged and satisfactory (torque during the operation stable);

Sample D (4.0% of fc): Sliding surface unchanged and satisfactory (torque during the operation stable);

Sample E (6.0% of fc): Sliding surface unchanged and satisfactory (torque during the operation stable);

Sample F (8.0% of fc): Sliding surface unchanged and satisfactory (torque during the operation stable);

Sample G (10.0% of fc): Partial peeling abrasion on the sliding surface (torque during the operation stable);

Sample H (11.0% of fc): Considerable peeling abrasion on the sliding surface (torque during the operation unstable).

In FIGS. 1 A and 1 B which, respectively show a relation between percentage by weight of a free carbon (fc) and the density of a sintered compact and a relation between percentage by weight and bending strength of the free carbon, the symbols used are defined as follows:

The dots (.) refer to samples wherein 0.2% by weight of B, 0.15% by weight of Al, 0.1% by weight of TiO$_2$ and respective percentage of free carbons in the range of 0.5-11% by weight are contained in each high density SiC sintered compact;

The crosses (x) refer to samples wherein 0.2% by weight of B, 0.15% by weight of Al and respective free carbons in the range of 0.5-2.5% by weight are contained in each high density SiC sintered compact;

The arrows up and down ( ↕ ) refer to fluctuation ranges and dots (.) mean averages in FIG. 1 B ; and The numeral 1 identifies the straight lines drawn between each two dots, 2 identifies the straight lines drawn between each two crosses, and 3 identifies the lines of the theoretical density.

As explicitly shown as a result of the experiment, it is concluded that a decline in the combination strength and abrasion resistance are prevented when the percentage by weight of (fc) is established in the range of 2-10%, more preferably in the range of 3-8%, and that a high density, i.e., a dense packed SiC sintered compact which eventually improves abrasion resistance of a slider is attained by adding 0.1-0.3% by weight of a titanium compound thereto as a abnormal grain growth inhibitor.

In addition, in the description of the foregoing embodiment, a slider according to this invention is applied to an oil seal for mechanical sealing, but the slider is also applicable to bearing or other fluid lubrication.

As has been described so far, when using a high-density SiC sintered compact as a slider for fluid lubrication, both the combination strength of grain boundaries and the abrasion resistance of the slider do not readily decline as far as the SiC compact contains free carbon (fc) in the range of 2-10% by weight irrespective of relative increase in the amount of free carbon (fc). Besides, when applying such a compact for mechanical sealing, bearing, etc., a film of fluid lubrication formed on the sliding surface is stabilized, and thus a peculiar advantage of improving sliding performance, i.e., sealing performance is exhibited in the lubrication by non-aqueous solvent, particularly in the oil lubrication.

What is claimed is:

1. A slider consisting essentially of a high-density silicon carbide sintered compact, sintered by pressureless sintering and containing 2-10% by weight of free carbon comprising a phenol resin uniformly distributed in the silicon carbide sintered compact to aid in sintering, and a relative density of not less than 95%, said high-density silicon carbide sintered compact containing boron and aluminum in the amount of 0.2-0.6% by weight with an atomic percentage thereof of $0.15 \leq B/Al < 2$.

2. A slider consisting essentially of a high-density silicon carbide sintered compact, sintered by pressureless sintering and containing 3-8% by weight of free carbon comprising a phenol resin uniformly distributed in the silicon carbide sintered compact to aid in sintering, and a relative density of not less than 95%, said high-density silicon carbide sintered compact containing boron and aluminum in the amount of 0.2-0.6% by weight with an atomic percentage thereof of $0.15 \leq B/Al < 2$.

* * * * *